US012792977B2

(12) United States Patent

Takada et al.

(10) Patent No.: US 12,792,977 B2
(45) Date of Patent: Nov. 10, 2026

(54) INFORMATION PROCESSING DEVICE AND INFORMATION NOTIFICATION SYSTEM

(71) Applicant: KYOCERA Document Solutions Inc., Osaka (JP)

(72) Inventors: Junpei Takada, Osaka (JP); Fumiya Sakashita, Osaka (JP); Shoichi Sakaguchi, Osaka (JP); Yumi Hirobe, Osaka (JP); Takuma Fujikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 244 days.

(21) Appl. No.: 18/712,322

(22) PCT Filed: Aug. 1, 2023

(86) PCT No.: PCT/JP2023/028131
§ 371 (c)(1),
(2) Date: May 22, 2024

(87) PCT Pub. No.: WO2024/034466
PCT Pub. Date: Feb. 15, 2024

(65) Prior Publication Data

US 2025/0013933 A1 Jan. 9, 2025

(30) Foreign Application Priority Data

Aug. 10, 2022 (JP) ................................ 2022-128452

(51) Int. Cl.
*G06Q 10/02* (2012.01)
*G06F 3/0484* (2022.01)
*G06Q 10/109* (2023.01)
*H04L 51/224* (2022.01)

(52) U.S. Cl.
CPC ........... *G06Q 10/02* (2013.01); *G06F 3/0484* (2013.01); *G06Q 10/109* (2013.01); *H04L 51/224* (2022.05)

(58) Field of Classification Search
CPC .... G06Q 10/02; G06Q 10/109; G06F 3/0484; H04L 51/224
See application file for complete search history.

(56) References Cited

U.S. PATENT DOCUMENTS 9,247,522 B1 * 1/2016 Chen ..................... H04W 4/029
10,607,193 B1 * 3/2020 Wender ................... H04W 4/21
(Continued)

FOREIGN PATENT DOCUMENTS

JP 2013-161163 A 8/2013
JP 2016-518786 A 6/2016
JP 2020052699 A 4/2020

*Primary Examiner* — Keith D Bloomquist
(74) *Attorney, Agent, or Firm* — IP Business Solutions, LLC.

(57) ABSTRACT

In an information notification system, an information processing device on a sending side that sends an e-mail includes: an operation device through which a reminder sending date and time earlier than a start date and time for a conference is to be input; and a controller that, upon satisfaction of a predetermined condition, brings forward the reminder sending date and time and, at the reminder sending date and time, executes sending of the e-mail to an information processing device on a receiving side that receives the e-mail.

4 Claims, 10 Drawing Sheets

(56) References Cited

U.S. PATENT DOCUMENTS

| | | | | |
|---|---|---|---|---|
| 2003/0001727 | A1* | 1/2003 | Steinmark | G08B 21/24 340/309.16 |
| 2010/0291950 | A1* | 11/2010 | Lin | H04L 67/62 455/456.3 |
| 2012/0164997 | A1* | 6/2012 | Iyer | G06Q 10/109 455/414.2 |
| 2013/0315041 | A1* | 11/2013 | Hiremath | G06Q 10/10 368/10 |
| 2015/0180819 | A1* | 6/2015 | Tanno | G06Q 30/02 715/752 |
| 2015/0281377 | A1 | 10/2015 | Qi et al. | |
| 2021/0049558 | A1* | 2/2021 | Kon | G06Q 10/1093 |

* cited by examiner

Fig.6

CD1

| NAME | MAIL ADDRESS | LOCATION | OTHERS |
|---|---|---|---|
| A | AAA@wwww.xxx | XY(111,222) | ······ |
| B | BBB@wwww.xxx | XY(333,444) | ······ |
| C | CCC@wwww.xxx | XY(555,666) | ······ |
| D | DDD@wwww.xxx | XY(777,888) | ······ |

CD2

| CONFERENCE ROOM | LOCATION |
|---|---|
| CONFERENCE ROOM I | XY(888,111) |
| CONFERENCE ROOM II | XY(888,222) |
| CONFERENCE ROOM III | XY(999,555) |
| CONFERENCE ROOM IV | XY(777,333) |

CD

INFORMATION PROCESSING DEVICE AND INFORMATION NOTIFICATION SYSTEM

TECHNICAL FIELD

The present invention relates to information processing devices and information notification systems and particularly relates to a technique for notifying of an event destination, the start date and time for the event, and so on by notification information.

BACKGROUND ART

There is an information notification system including a plurality of information processing devices that transmit and receive via a server on a network an e-mail for notifying of a conference room, a start date and time for the conference, and so on.

For example, in a resource reservation system described in Patent Literature 1, reservation information on a reservation for a resource, such as a conference room, is acquired, a method for sending a notification about the reservation for a resource or destinations of the notification are determined according to the acquired reservation information, and the notification about the reservation for a resource is sent to terminal devices by the determined sending method or sent to the determined destinations. Thus, the notification about the reservation for a resource is sent without limitation to the person who made the reservation.

CITATION LIST

Patent Literature

Patent Literature 1: JP-A-2020-52699

SUMMARY OF INVENTION

Technical Problem

In relation to notification of a conference room, a start date and time for the conference, and so on by e-mail, a reminder notification is often made in which a date and time earlier than the start date and time for the conference is previously designated and an e-mail for notification is sent from an information processing device on the sending side to information processing devices on the receiving side at the designated date and time. Thus, users of the information processing devices on the receiving side can read the e-mail received at the date and time earlier than the start date and time for the conference and arrive at the conference room without being late to the conference.

However, it has never been done before to appropriately change the date and time for sending an e-mail as a reminder notification. For example, if a user's location changes and its distance from the conference room becomes longer than the original distance, the e-mail should preferably be sent at an earlier date and time. Furthermore, when the conference has a high level of importance, the e-mail should preferably be sent at an earlier date and time than when the conference would have a low level of importance. Therefore, if the date and time for sending the e-mail can be changed according to various conditions, the convenience of reminder notification will increase.

Although in Patent Literature 1 the method for sending a notification about a reservation for a resource or destinations of the notification are determined according to reservation information, the date and time for sending the notification about the reservation is not changed.

The present invention has been made in view of the foregoing circumstances and has an object of changing the time to notify of an event destination and a start date and time for the event to a suitable time for the user.

An information processing device according to one aspect of the present invention is an information processing device on a sending side that sends notification information notifying of a start date and time for an event via a server on a network to another information processing device on a receiving side, and the information processing device on the sending side includes: a communication device that communicates with the information processing device on the receiving side via the server; an input device that accepts an input of a reminder sending date and time earlier than the start date and time for an event; and a controller that, upon satisfaction of a predetermined condition, changes a first reminder sending date and time the input of which has been accepted by the input device to a second reminder sending date and time brought forward according to the condition and, at the second reminder sending date and time, executes sending of the notification information through the communication device to the information processing device on the receiving side where the notification information is to be received.

An information notification system according to another aspect of the present invention is an information notification system including a plurality of information processing devices that send and receive notification information notifying of a conference room and a start date and time for a conference via a server on a network, and the information notification system includes, among the plurality of information processing devices, at least the above-described information processing device according to the one aspect of the present invention as an information processing device on a sending side that sends the notification information.

BRIEF DESCRIPTION OF DRAWINGS

FIG. 6 is a view conceptually showing conference management data stored in a storage device of the information processing device in the conference room.

DESCRIPTION OF EMBODIMENTS

Figure 1:
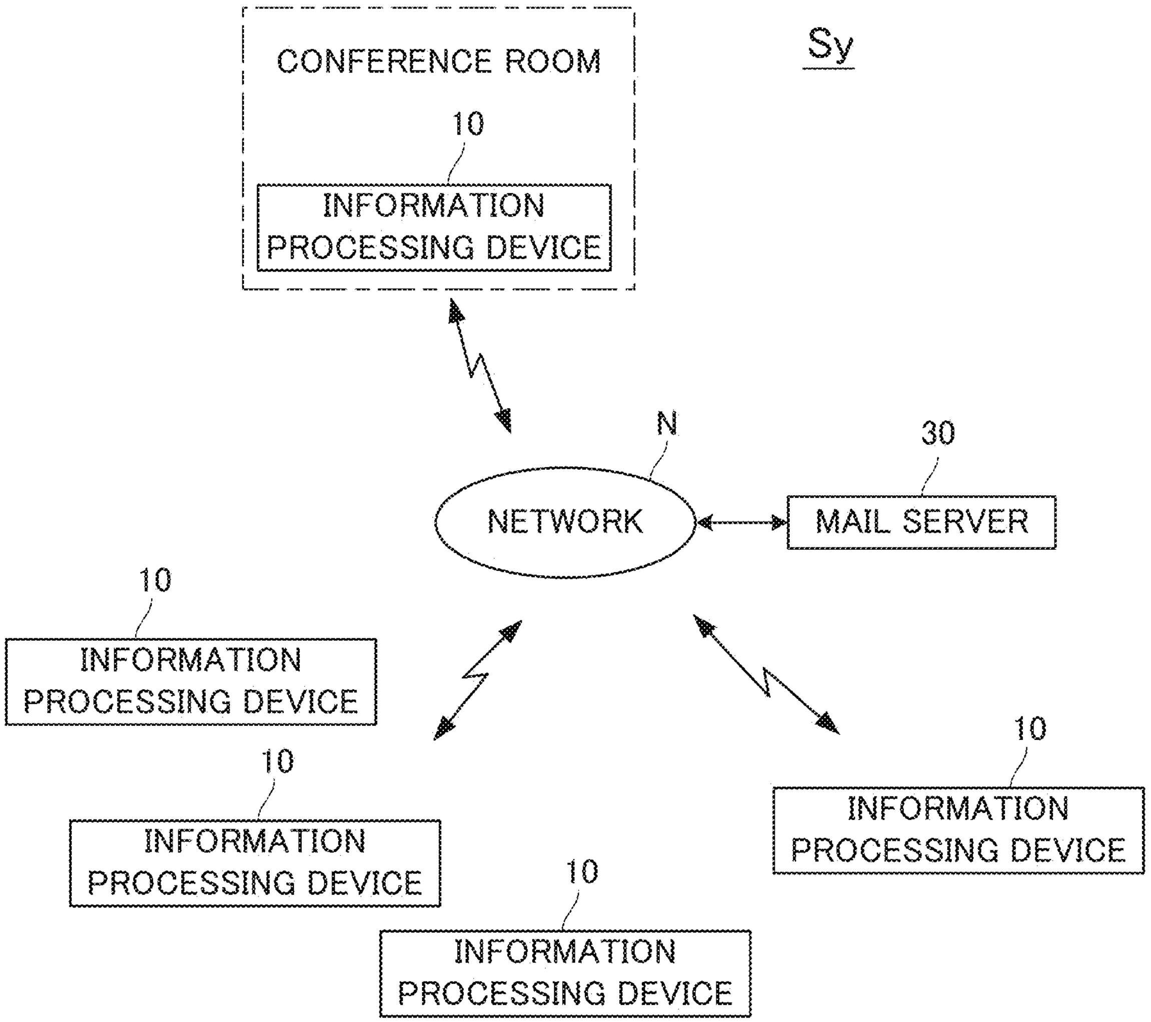
FIG. 1 is a block diagram showing the configuration of an information notification system according to an embodiment of the present invention.

Hereinafter, a description will be given of an information processing device and an information notification system according to an embodiment of the present invention with reference to the drawings. FIG. 1 is a block diagram showing the configuration of an information notification system according to an embodiment of the present invention.

An information notification system Sy according to this embodiment includes a plurality of information processing devices 10. In the information notification system Sy, the plurality of information processing devices 10 are connected to a network (such as an intranet) N and communicate notification information between them via a server 30 (for example, a mail server, the server 30 will hereinafter be explained as a mail server) on the network N. Furthermore, each of the information processing devices 10 accesses the server 30 over the network N. The notification information is information containing a message to be notified of and is, for example, an e-mail. Hereinafter, the notification information will be explained as an e-mail. The number of information processing devices 10 is not particularly limited.

Figure 2:
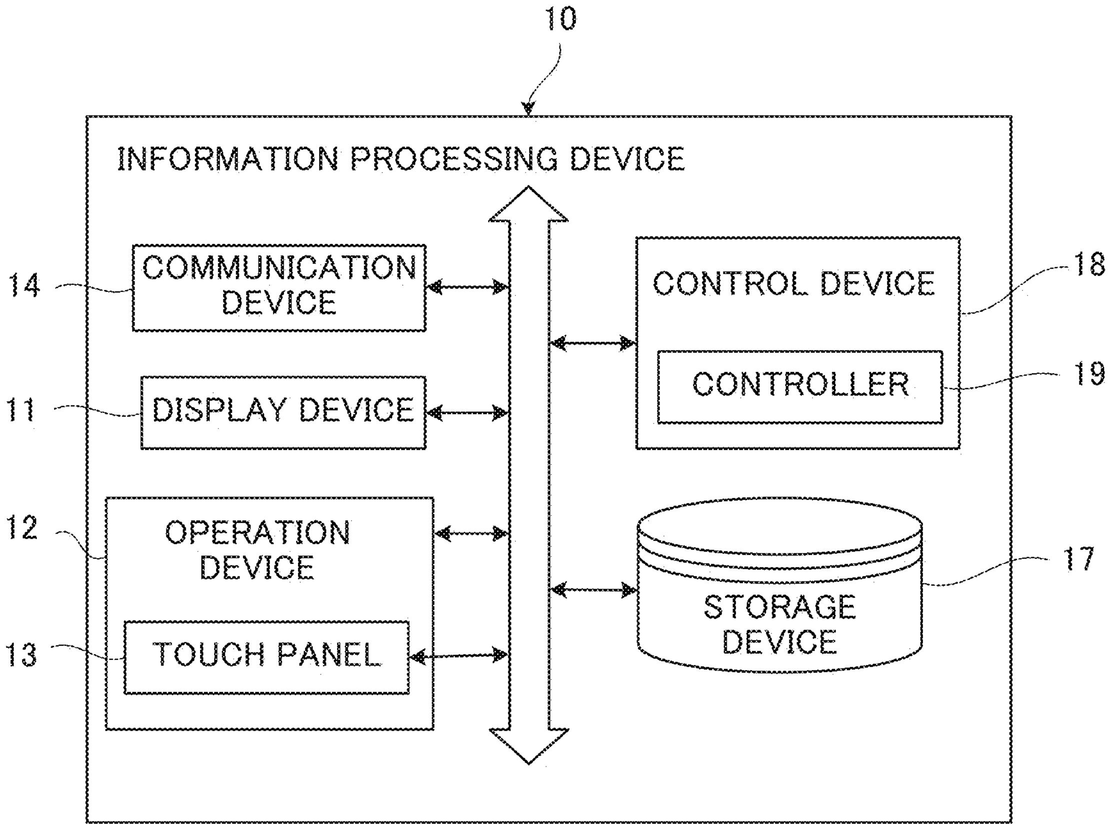
FIG. 2 is a block diagram showing an essential configuration of an information processing device in the information notification system according to the embodiment.

FIG. 2 is a block diagram showing an essential configuration of the information processing device 10. The information processing device 10 is, for example, a personal computer, a portable smartphone or a mobile and includes a display device 11, an operation device 12, a touch panel 13, a communication device 14, a storage device 17, and a control device 18.

The display device 11 is formed of a liquid crystal display (LCD), an organic EL (OLED: organic light-emitting diode) display or the like.

The touch panel 13 is provided to lie over the screen of the display device 11. The touch panel 13 detects a touch on the touch panel 13 with a user's finger or the like together with a point of touch and outputs a detection signal indicating the coordinate of the point of touch as a signal specifying an instruction to a controller 19 of the control device 18. Thus, through the touch panel 13, an input of an instruction based on a GUI (graphical user interface) or the like being displayed on the screen of the display device 11 can be achieved. The touch panel 13 functions as part of the operation device 12.

The operation device 12 includes a keyboard, a pointing device, physical keys, all of which can be operated by the user. The operation device 12 accepts an input of an instruction according to a user's operation of the keyboard or others and outputs the accepted instruction to the controller 19. The operation device 12 is an example of an input device defined in Claims.

The communication device 14 is a communication interface including a communication module, such as a LAN chip. The communication device 14 is connected via the network N to the server 30 and performs data communication with the server 30.

The storage device 17 is a large-capacity storage device, such as an SSD (solid state drive) or an HDD (hard disk drive), and stores various types of application programs and various types of data.

The control device 18 is made up of a processor, a RAM (random access memory), a ROM (read only memory), and so on. The processor is, for example, a CPU (central processing unit), an ASIC (application specific integrated circuit), an MPU (micro-processing unit) or the like. When an information notification program stored in the above-mentioned ROM or the storage device 17 is executed by the processor, the control device 18 functions as the controller 19.

The controller 19 governs the overall control of the information processing device 10. The control device 18 is connected to the display device 11, the operation device 12, the touch panel 13, the communication device 14, the storage device 17, and so on. The controller 19 performs control of the above-mentioned components and performs signal and data transfer to and from the components.

The controller 19 serves as a processor that executes various type of processing to be described hereinafter. Furthermore, the controller 19 has the function to control the display device 11 and the communication device 14.

In the information notification system Sy having the structure described so far, for example, one of the plurality of information processing devices 10 is a PC placed in a conference room (an example of an event destination) or a PC managed by a user serving as a manager and is operated by the manager of a conference (an example of an event) (hereinafter, this information processing device 10 is referred to as a conference room information processing device 10). On the other hand, the other information processing devices 10 are PCs placed on respective desks or tables for participants participating in the conference or respective portable terminals or mobiles carried by the participants and are operated by the participants (hereinafter, these information processing devices 10 are referred to as participants' information processing devices 10).

The manager and participants are a plurality of users that use the information notification system Sy and their respective information processing devices 10. Alternatively, a participant may serve also as the manager.

In each of the information processing devices 10, the above-mentioned information notification program for creating, sending, and receiving an e-mail is run, an e-mail is created and sent according to operations of the manager or the participant, and an e-mail is received. The e-mail is received by the server 30 on the network N and sent from the server 30 to each of the information processing devices 10.

The server 30 is connected to the network N (for example, a corporate network) and each of the information processing devices 10 is accessible to the server 30.

For example, when on the conference room information processing device 10 a predetermined icon being displayed on the display device 11 is specified by a manager's operation of the pointing device or the keyboard of the operation device 12, an instruction to run the information notification program for creating, sending, and receiving an e-mail is accepted by the operation device 12. The controller 19 executes the information notification program stored in the storage device 17 and, in accordance with the information notification program, allows the display device 11 to display on the screen a window for creating, sending, and receiving an e-mail (hereinafter, referred to as a mail window). The information notification program is an application program for creating, sending, and receiving an e-mail (for example, a program developed from Microsoft Office365 Outlook by Microsoft Corporation, but it is not intended to limit the information notification program to a program developed from Microsoft Office365 Outlook).

When the operation device 12 accepts an input of various information necessary for the operation device 12 to create an e-mail, based on manager's operations of buttons in the mail window being displayed on the screen of the display device 11 using the pointing device or keyboard of the operation device 12, the controller 19 creates, based on the information, an e-mail notifying of a conference room, a start date and time for the conference, and so on. Furthermore, the controller 19 sets the mail addresses of conference participants as destinations of the e-mail and allows the communication device 14 to send the e-mail. This e-mail is received by the server 30 via the network N and sent to the participant information processing devices 10 by the server 30. Each of the participants executes the above-described information notification program for creating, sending, and receiving an e-mail on their own information processing device 10 (the information processing device 10 on the receiving side). Upon receipt of the e-mail from the server 30 through the communication device 14, the controller 19 of the information processing device 10 (on the receiving side) allows the display device 11 to display a mail window on the screen and display the contents indicated by the e-mail, such as a conference room and a start date and time for the conference, in the mail window. When viewing the mail window, the user can confirm the contents indicated by the e-mail.

In notifying the user of a conference room, a start date and time for the conference, and others by an e-mail, a reminder notification is made in which the e-mail is sent from, for example, the conference room information processing device 10 to the participant's information processing device 10 at a predetermined reminder sending date and time earlier than (for example, 10 minutes before) the start date and time for the conference. Thus, the participant is notified, at the date and time earlier than the start date and time for the conference, that the conference is scheduled to start.

In doing so, if the distance from the location of the participant to the conference room is long, a reminder notification should preferably be sent at a time earlier than the usual time for sending it. Furthermore, also when the level of importance of the conference is a predetermined high value (for example, when the level of importance is "high" among three levels: high, medium, and low), a reminder notification should preferably be sent at a time earlier than the usual time for sending it. In other words, if the date and time for sending the e-mail can be changed according to various conditions, the convenience of reminder notification will increase.

Therefore, in the information notification system Sy according to this embodiment, in sending an e-mail as a reminder notification, the controller 19 of the conference room information processing device 10 changes according to various conditions the reminder sending date and time at which the e-mail is to be sent.

For example, the controller 19 calculates, for each of the participants, a travel time it takes for the participant to move to the conference room, appropriately changes, for each of the participants, the reminder sending date and time according to the travel time, and, at each of the changed reminder sending dates and times for the participants, allows the communication device 14 to send the e-mail to the individual participant's mail address as a destination of the e-mail. The e-mail is received via the network N by the server 30 and sent from the server 30 to each participant's information processing device 10. Thus, even if the participants are located away from the conference room differently from participant to participant, an e-mail notification can be given to each participant at a suitable reminder sending date and time for the participant.

Furthermore, the controller 10 appropriately changes the reminder sending date and time according to the level of importance of the conference and, at the changed reminder sending date and time, allows the communication device 14 to send the e-mail to the respective participants' mail addresses as destinations of the e-mail. This e-mail is received via the network N by the server 30 and sent from the server 30 to each of the participants' information processing devices 10. Thus, an e-mail notification is given at an appropriate reminder sending date and time for the level of importance of the conference.

Figure 3A:
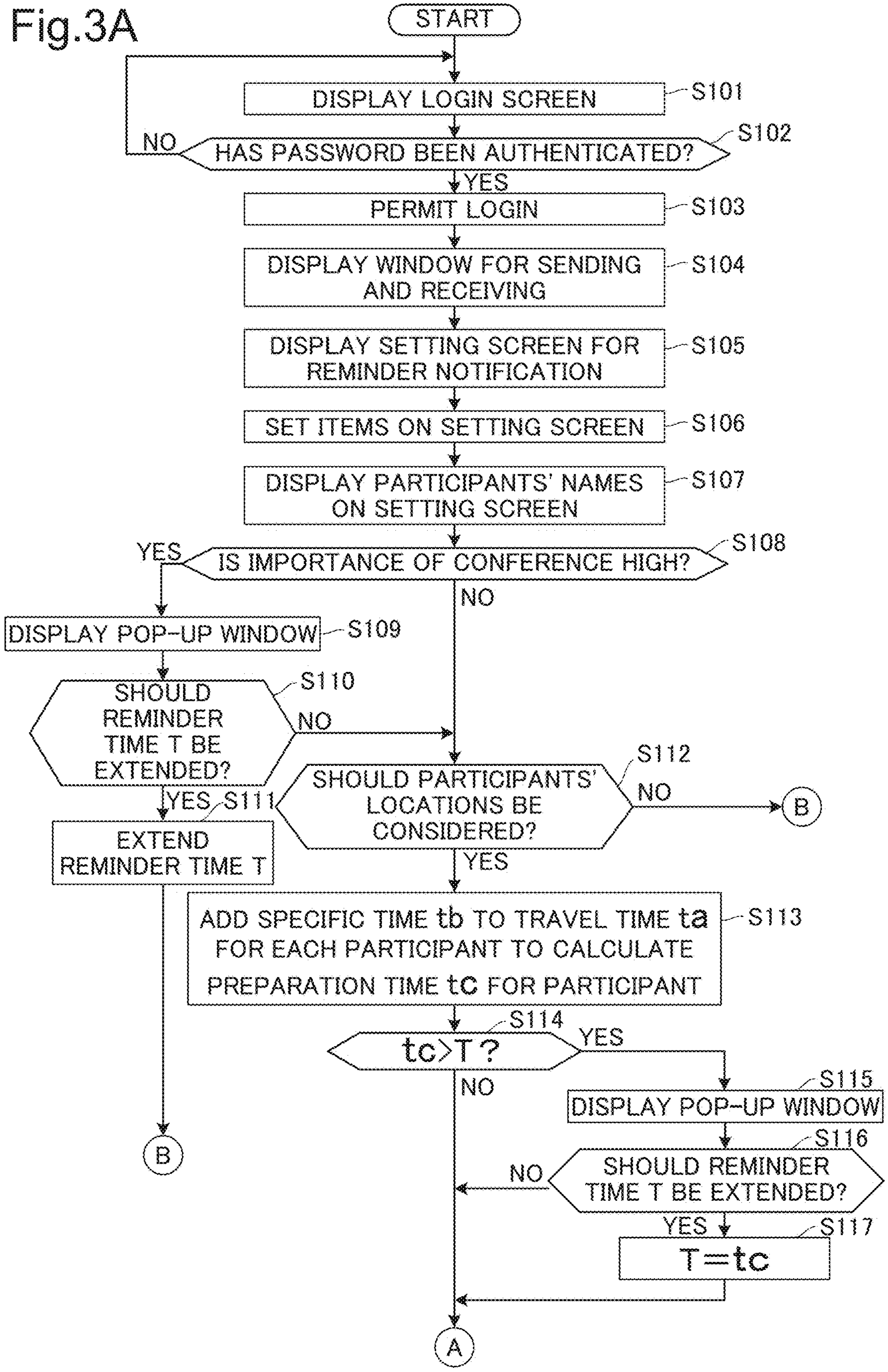
FIG. 3A is a flowchart showing a control procedure for changing the reminder sending date and time at which an e-mail as a reminder notification is to be sent and sending the e-mail from an information processing device in a conference room to an information processing device of each participant at the reminder sending date and time.
Figure 3B:
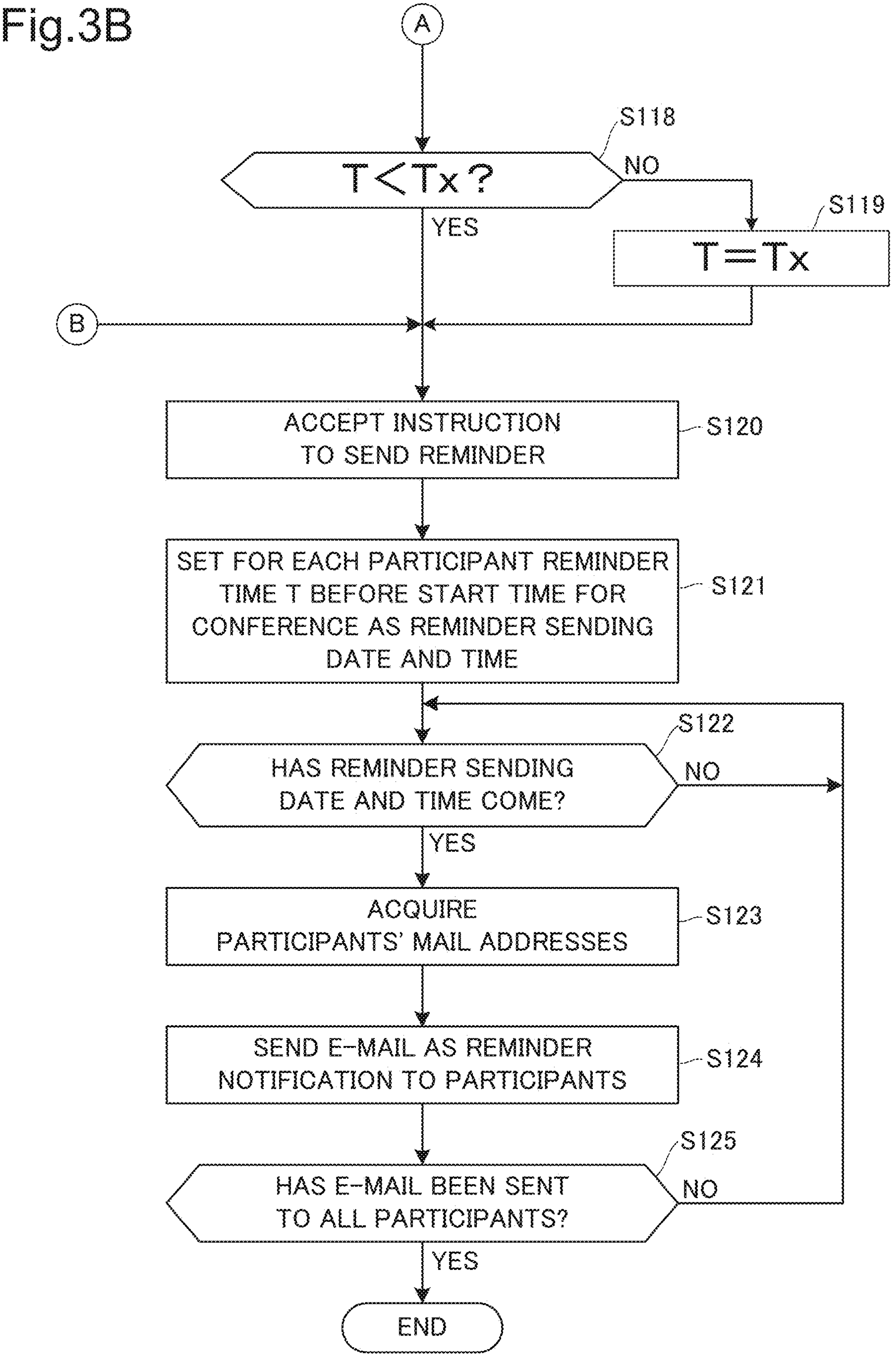
FIG. 3B is a flowchart showing a control procedure continued from FIG. 3A.

Next, a description will be given of a control procedure for changing, according to various conditions as described above, the reminder sending date and time at which an e-mail as a reminder notification is to be sent and sending the e-mail from the conference room information processing device 10 to each participant's information processing device 10 at the changed reminder sending date and time, with reference to the flowcharts shown in FIGS. 3A and 3B and so on.

Figure 4:
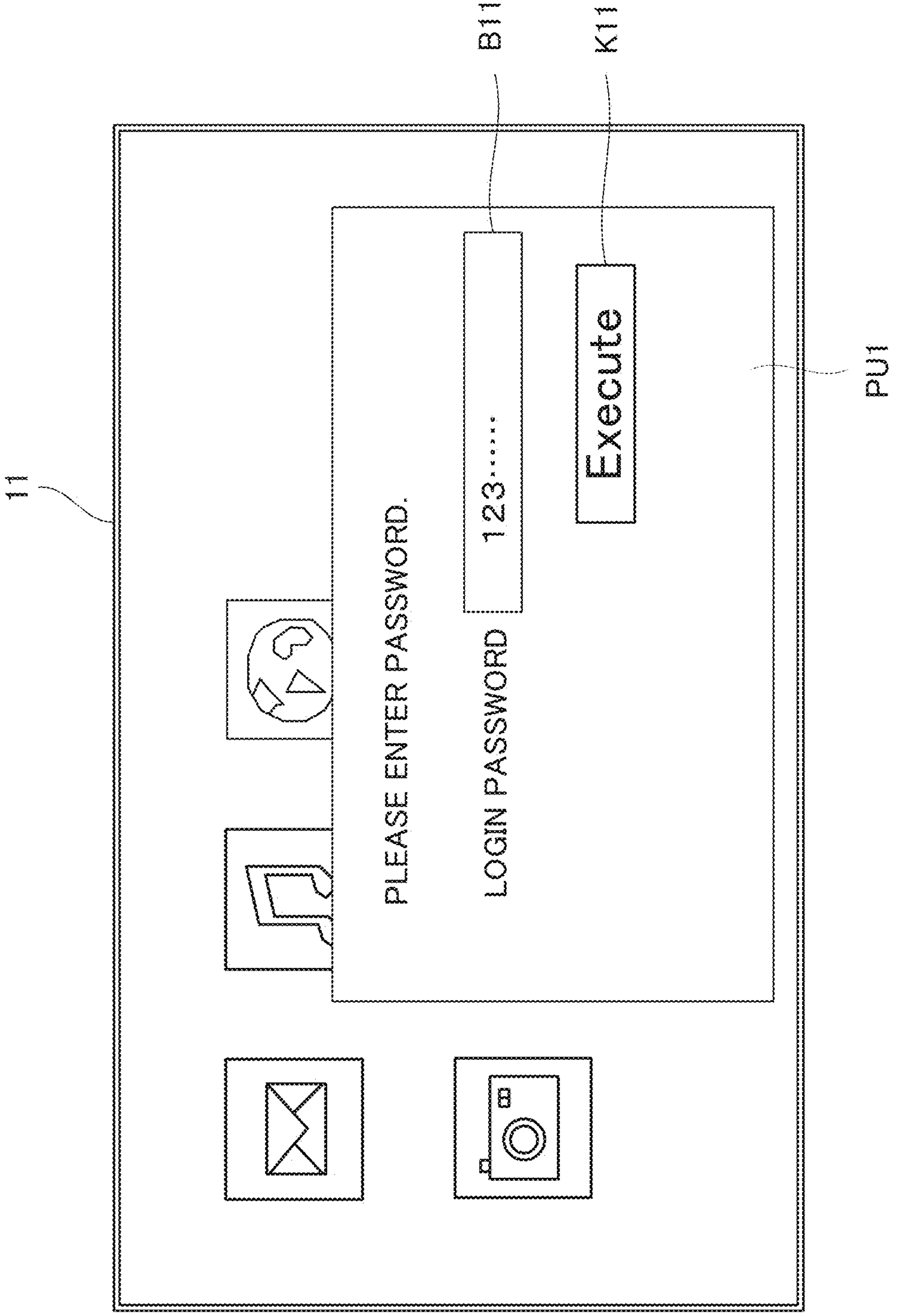
FIG. 4 is a view showing a pop-up window for login displayed on a display device of the information processing device in the conference room.

When on the conference room information processing device 10 a predetermined icon being displayed on the display device 11 is specified by a manager's operation of the pointing device or the keyboard of the operation device 12, an instruction to run the information notification program for creating, sending, and receiving an e-mail is accepted by the operation device 12. In accordance with this instruction, the controller 19 allows the display device 11 to display a pop-up window PU1 for login like that shown as an example in FIG. 4 (S101). In this pop-up window PU1 for login, a text box B11 into which a login password for the manager is to be entered and an Execute key K11 are displayed.

The manager operates the pointing device or the keyboard of the operation device 12 to enter the login password for the manager. The controller 19 of the conference room information processing device 10 allows the entered login password to be displayed in the text box B11 of the pop-up window PU1. When the manager then operates the Execute key K11, the controller 19 determines whether or not the login password displayed in the text box B11 is equal to the login password of the manager previously stored in the storage device 17 (S102). When determining that the passwords are equal ("Yes" in S102), the controller 19 permits a login of the manager (S103) and executes the information notification program stored in the storage device 17. The controller 19 allows the display device 11 to display a mail window (not shown) in accordance with the information notification program (S104).

On the other hand, when the controller 19 of the conference room information processing device 10 determines that the login password displayed in the text box B11 is not equal to the login password of the manager previously stored in the storage device 17 ("No" in S102), the controller 19 neither executes the information notification program instructed in S101 nor allows the display device 11 to display a mail window.

After S104, the manager operates the pointing device or the keyboard of the operation device 12 to use the function of the mail window to instruct to execute a reminder notification by e-mail. In response to the instruction to execute a reminder notification, the controller 19 of the conference room information processing device 10 allows the display device 11 to display on the screen a setting window G1 for reminder notification like that shown in FIG. 5 (S105).

Figure 5:
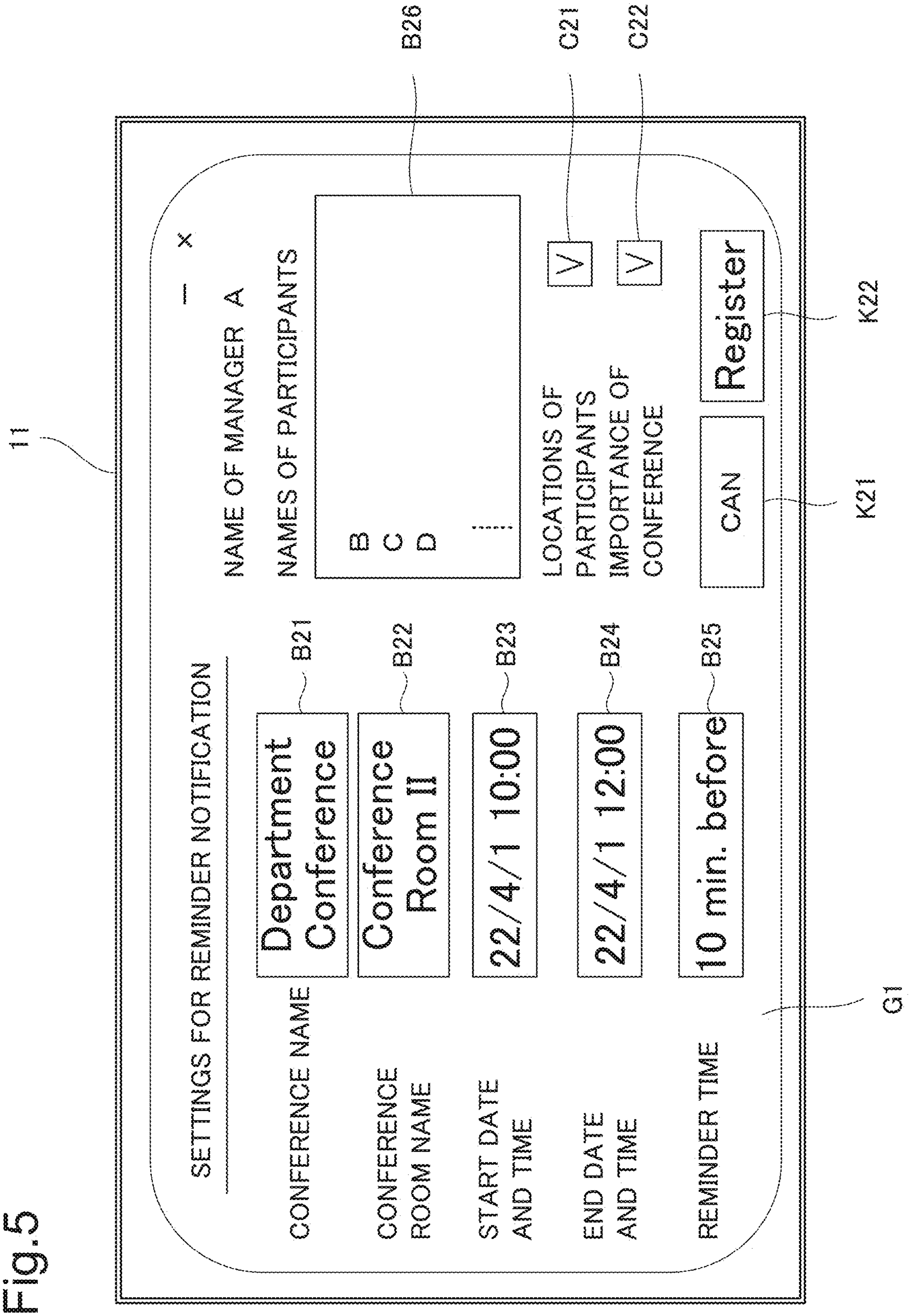
FIG. 5 is a view showing a setting window for reminder notification displayed on the display device of the information processing device in the conference room.

The setting window G1 for reminder notification shown in FIG. 5 displays: a text box B21 where a conference name is to be shown; a text box B22 where a conference room name is to be shown; a text box B23 where a start date and time for a conference is to be shown; a text box B24 where an end date and time for the conference is to be shown; a text box B25 where a reminder time T from a reminder sending date and time to the start date and time for the conference is to be shown; a text box B26 where participants' names are to be shown; a check box C21 where an instruction of whether to associate the locations of participants with the reminder notification is to be accepted; a check box C22 where an instruction of whether or not the conference is important is to be accepted; a Cancel key K21, and a Register key K22.

The manager operates the pointing device or the keyboard of the operation device 12 to select each of the text boxes B21 to B25 in the setting window G1 for reminder notification being displayed on the display device 11 and enter a conference name, a conference room name, a start date and time for the conference, an end date and time for the conference, and a reminder time T from a reminder sending date and time to the start date and time for the conference into the respective associated text boxes B21 to B25 (S106). Furthermore, if necessary, the manager operates the operation device 12 to input an instruction to take the locations of participants into consideration and an instruction indicating that the level of importance of the conference is high (S106). The above contents entered are accepted by the operation device 12 and output from the operation device 12 to the controller 19. FIG. 5 shows an example where a conference name "Department Conference" is shown in the text box B21, a conference room name "Conference Room II" is shown in the text box B22, a start date and time "22/4/1 10:00" is shown in the text box B23, an end date and time "22/4/1 12:00" is shown in the text box B24, and a reminder time T "10 min." is shown in the text box B25. Furthermore, FIG. 5 shows an example where both of an instruction to take the locations of the participants into consideration and an instruction indicating that the level of importance of the conference is high are input and the controller 19 allows check marks to be placed into the respective check boxes C21 and C22.

Moreover, the manager operates the pointing device or the keyboard of the operation device 12 to input, through the setting window G1 for reminder notification being displayed on the display device 11, an instruction to display a list of the names of a plurality of users to the operation device 12. Conference management data CD like that shown as an example in FIG. 6 is stored in the storage device 17. The controller 19 of each of the information processing devices 10 operates in accordance with the information notification program to perform an information sharing function. Among the information processing devices 10 including the conference room information processing device 10, a schedule of the conference and the conference management data CD are shared through the network N and the server 30 by the information sharing function. Each of the information processing devices 10 receives, through its own communication device 14, schedules of the conference and the conference management data CD stored in the other information processing devices 10, updates them as needed, and stores them in the storage device 17. In other words, the schedule of the conference and the conference management data CD are synchronized among the information processing devices 10 by the information sharing function and, after the synchronization, the same schedule of the conference and the same conference management data CD are stored in each of the information processing devices 10. The schedule of the conference and the conference management data CD are written or rewritten by the controller 19 using information input by the operation of the operation device 12 of each of the information processing devices 10. In the case where the information notification program used is, for example, a program developed from Microsoft Office365 Outlook by Microsoft Corporation, the above information sharing function is a file sharing function.

The conference management data CD contains a data set CD1 and a data set CD2. The data set CD1 stores, for example, the names of a plurality of users (including a manager and conference participants), the users' mail addresses (an example of destination information indicating the destinations of notification information), and the respective locations of the users' information processing devices 10. The data set CD2 stores the conference room names and their location information in association with each other. The controller 19 of the conference room information processing device 10 reads the names of all the users (including the manager and conference participants) from the conference management data CD and allows the display device 11 to display a list of the users' names, for example, in a separate window different from the setting window G1 on the screen.

During the display of the separate window, the manager operates the pointing device or the keyboard of the operation device 12 to select on the list the names of participants who will participate in the conference. According to this operation, a selection instruction on the selected participants is accepted through the operation device 12 by the controller 19. Upon acceptance of the selection instruction, the controller 19 of the conference room information processing device 10 hides the separate window and allows the names of the participants specified by the selection instruction to be displayed in the text box B26 in the setting window G1 for reminder notification (S107).

The mail address of each of the users in the conference management data CD is a mail address previously set on the information processing device 10 of the user and stored in the storage device 17 of the information processing device 10 of the user. Then, by the above-described synchronization among the information processing devices 10, the same conference management data CD is stored in the storage devices 17 of all the users' information processing devices 10.

The location of each of the users' information processing devices 10 in the conference management data CD is a location detected by the information processing device 10 of the user and stored in the conference management data CD. For example, when an information processing device 10 is a portable terminal device or a mobile, the location of the information processing device 10 is detected by a GPS function integrated into the information processing device 10. When an information processing device 10 is a desktop PC, the location of the information processing device 10 is detected based on the reception level of a beacon signal sent from a Wi-Fi (registered trademark) base unit and received by the communication device 14 of the information processing device 10. The controller 19 rewrites the corresponding location information in the data set CD1 to the detected location of the information processing device 10. Alternatively, location information input by the user's operation of the operation device 12 of the information processing device 10 may be set as the location of the information processing device 10.

The conference room names and their location information in the data set CD2 of the conference management data CD are input by a user's operation of the operation device 12 on the information processing device 10 and stored in the storage device 17.

Figure 7:
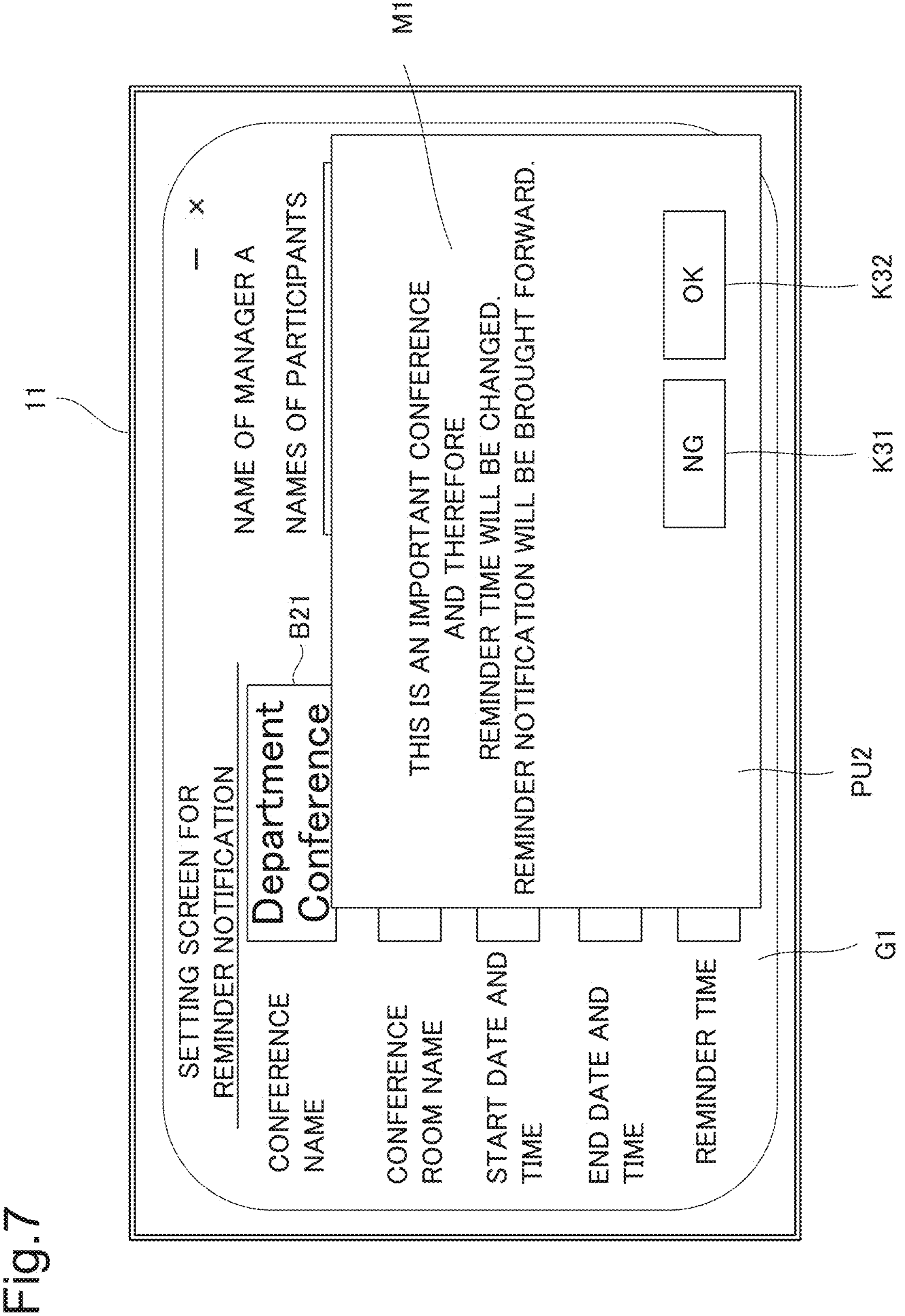
FIG. 7 is a view showing a pop-up window displayed on the display device of the information processing device in the conference room for the purpose of selecting whether to extend a reminder time.

Subsequently, the controller 19 of the conference room information processing device 10 determines whether or not an instruction indicating that the level of importance of the conference is high has been accepted (S108). When determining that an instruction indicating that the level of importance of the conference is high has been accepted ("Yes" in S108), the controller 19 allows the display device 11 to display a pop-up window PU2 for selecting whether to extend the reminder time T (the time from the reminder sending date and time to the start date and time for the conference) of each of the participants' information processing devices 10, like that as an example shown in FIG. 7 (S109). In this pop-up window PU2, a message M1 indicating that the reminder time T will be changed, an NG key K31, and an OK key 32 are displayed.

When the manager operates the pointing device or the keyboard of the operation device 12 to select the OK key 32 in the pop-up window PU2, an extension instruction to extend the reminder time T is accepted by the operation device 12 ("Yes" in S110). The controller 19 previously sets, for example, a standard reminder time T to a predetermined time (10 minutes in this case). Furthermore, the controller 19 sets a predetermined extension time td (for example, 5 minutes) that will be added to the reminder time T in accordance with the extension instruction. Thus, the controller 19 extends the reminder time T for the participants' information processing devices 10 from "10 minutes" to "15 minutes" (S111). Then, the controller 19 hides the pop-up window PU2. Thereafter, the processing goes to S120. As described above, when the level of importance of a conference is high, the reminder time T for the participants' information processing devices 10 is extended from "10 minutes" to "15 minutes".

On the other hand, when the manager operates the pointing device or the keyboard of the operation device 12 to select the NG key 31 in the pop-up window PU2, an instruction not to extend the reminder time T is accepted by the operation device 12 ("No" in S110). In this case, the controller 19 of the conference room information processing device 10 does not execute the step S111 and keeps the reminder time T as it is. Then, the controller 19 hides the pop-up window PU2. Thereafter, the processing goes to S112.

Also when determining that no instruction indicating that the level of importance of the conference is high has been accepted ("No" in S108), the controller 19 of the conference room information processing device 10 keeps the reminder time T for the participants' information processing devices 10 as it is because the level of importance of the conference is not high. Thereafter, the processing goes to S112.

Subsequently, the controller 19 of the conference room information processing device 10 determines whether or not an instruction to take the locations of participants into consideration has been accepted (S112).

When determining that an instruction to take the locations of participants into consideration has been accepted ("Yes" in S112), the controller 19 of the conference room information processing device 10 acquires, with reference to the conference management data CD, the location of the conference room and the respective locations of the information processing devices 10 of the participants (i.e., the above-mentioned selected participants) being displayed in the text box B26 of the setting window G1 for reminder notification. Furthermore, the controller 19 calculates the respective distances from the participants' information processing devices 10 to the conference room, calculates, based on these distances, the respective travel times ta it takes for the participants to move to the conference room using a predetermined standard walking speed, and adds a predetermined specific time tb to each of the travel times ta to calculate respective preparation times tc for the participants' information processing devices 10 (S113). Alternatively, the controller 19 may not add the specific time tb to the travel times ta and may calculate the travel times ta themselves as the preparation times tc.

The preparation time tc for each of the participants' information processing devices 10 is calculated as the time it takes for each participant to prepare for the conference and move to the conference room from when the participant's information processing device 10 has received a reminder notification.

Figure 8:
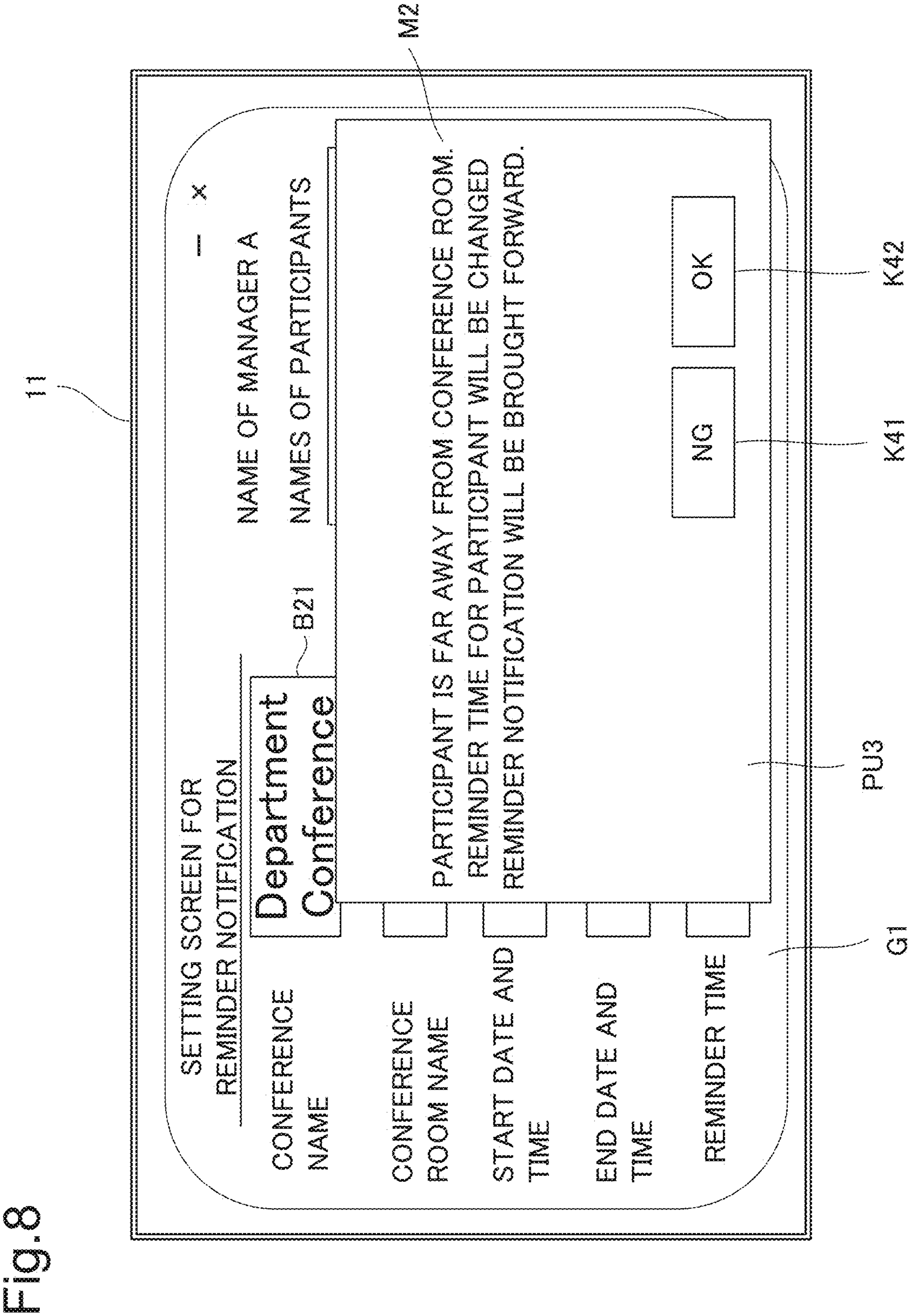
FIG. 8 is a view showing another pop-up window displayed on the display device of the information processing device in the conference room for the purpose of selecting whether to extend the reminder time.

The controller 19 of the conference room information processing device 10 compares, for each of the preparation times tc for the participants' information processing devices 10, the preparation time tc with the reminder time T to determine whether or not the preparation time tc is longer than the reminder time T (S114). When the preparation time tc is longer than the reminder time T, even if the user leaves for the conference room at the time of receipt of a reminder notification, the user will be late for or miss the conference, i.e., the user has an insufficient reminder time T. Therefore, when the preparation time tc is longer than the reminder time T ("Yes" in S114), the controller 19 allows the display device 11 to display a pop-up window PU3 for selecting whether to extend the reminder time T of the participant's information processing device 10, like that as an example shown in FIG. 8 (S115). In this pop-up window PU3, a message M2 indicating that the reminder time T will be changed, an NG key K41, and an OK key 42 are displayed.

When the manager operates the pointing device or the keyboard of the operation device 12 to select the OK key 42 in the pop-up window PU3, an instruction to change the notification time is accepted by the operation device 12 ("Yes" in S116). In accordance with the instruction to change the notification time, the controller 19 of the conference room information processing device 10 extends, for the participant's information processing device 10 for which the preparation time tc has been determined to be longer than the reminder time T, the reminder time T so that the preparation time tc becomes equal to or shorter than the reminder time T (S117). For example, the controller 19 extends the reminder time T to change the reminder sending date and time so that the preparation time tc is equal to the reminder time T. Then, the controller 19 hides the pop-up window PU3. Thereafter, the processing goes to S118. Alternatively, in S117, the controller 19 may add the above-mentioned extended portion of the extended reminder time T to the reminder time T for all the participants' information processing devices 10, thus extending the reminder time T for all the participants' information processing devices 10.

Therefore, in the case where a participant is far away from the conference room and will be late for the conference even if the participant leaves for the conference room, the reminder time T is extended to a preparation time tc it takes for the participant to prepare for the conference and move to the conference room from when the participant's information processing device 10 has received a reminder notification, or a time longer than the preparation time tc.

On the other hand, when the manager operates the pointing device or the keyboard of the operation device 12 to select the NG key in the pop-up window PU3, an instruction not to extend the reminder time T is accepted by the operation device 12 ("No" in S116). The controller 19 does not execute the step S117, keeps the reminder time T as it is, and hides the pop-up window PU3. Thereafter, the processing goes to S118.

Also when in S114 the preparation time tc is equal to or shorter than the reminder time T ("No" in S114), the controller 19 of the conference room information processing device 10 keeps the reminder time T as it is because the preparation time tc is long enough. Then, the processing goes to S118.

As thus far described, for each of the participants' information processing devices 10, the reminder time T is extended to the preparation time tc when the reminder time T is insufficient, whereas the reminder time T remains unextended when the reminder time T is sufficient.

After the reminder time T for each of the participants' information processing devices 10 is extended or kept, the controller 19 of the conference room information processing device 10 compares, for each of the participants' information processing devices 10, the reminder time T with a predetermined allowable time Tx to determine whether or not the reminder time T is shorter than the allowable time Tx (S118). When the reminder time T is equal to or longer than the allowable time Tx ("No" in S118), the controller 19 reduces the reminder time T to make it equal to the allowable time Tx (S119). When the reminder time T is shorter than the allowable time Tx ("Yes" in S118), the controller 19 does not execute the step S119 and keeps the reminder time T as it is. The allowable time Tx used herein refers to the time obtained by adding a predetermined time (for example, 10 minutes) to the time it takes to move from, among the locations of participants stored in the conference management data CD, the location of the participant closest to the location of the selected conference room to the location of the selected conference room.

Thus, it can be prevented that the reminder time T becomes excessively long. The reason for this is that if the reminder time T becomes excessively long, the time from when the participant receives a reminder notification to when the participant leaves for the conference is long and, therefore, the participant may forget the conference. However, the processing in S118 and S119 may be omitted.

As thus far described, in this embodiment, in the case where the level of importance of a conference is high and the manager allows extension of the reminder time T, the reminder time T is extended.

Furthermore, in the case where the preparation time tc is longer than the reminder time T and the manager allows extension of the reminder time T, the reminder time T is extended and, thus, the preparation time tc becomes equal to or shorter than the reminder time T.

Moreover, when the reminder time T is equal to or shorter than the allowable time Tx, the reminder time T is not restricted. On the other hand, when the reminder time T exceeds the allowable time Tx, the reminder time T is reduced to make it equal to the allowable time Tx.

When the settings of various items in the setting window G1 for reminder notification are completed, the manager operates the pointing device or the keyboard of the operation device 12 to select the Register key K22.

When the Register key K22 is selected and an instruction to set the reminder sending date and time is accepted by the operation device 12 (S120), the controller 19 of the conference room information processing device 10 calculates, for each of the participants' information processing devices 10, the reminder time T before the start date and time for the conference as a reminder sending date and time and sets the reminder sending date and time (S121). Thus, the reminder sending date and time for each of the participants' information processing devices 10 is set.

When the manager operates the Cancel key K21 and an instruction to cancel the settings is accepted by the operation device 12, the controller 19 of the conference room information processing device 10 overrides the settings of various items made during the display of the setting window G1 for reminder notification. Thereafter, the control procedure shown in FIGS. 3A and 3B ends.

The controller 19 of the conference room information processing device 10 determines, for each of the participants' information processing devices 10, whether or not the current time has reached the reminder sending date and time ("No" in S122). When the current time reaches the reminder sending date and time ("Yes" in S122), the controller 19 reads and acquires from the conference management data CD the mail address of the participant for which the reminder sending date and time has been set (S123), creates an e-mail as a reminder notification for the mail address of the participant as a destination, and allows the communication device 14 to send this e-mail (S124).

Figure 9:
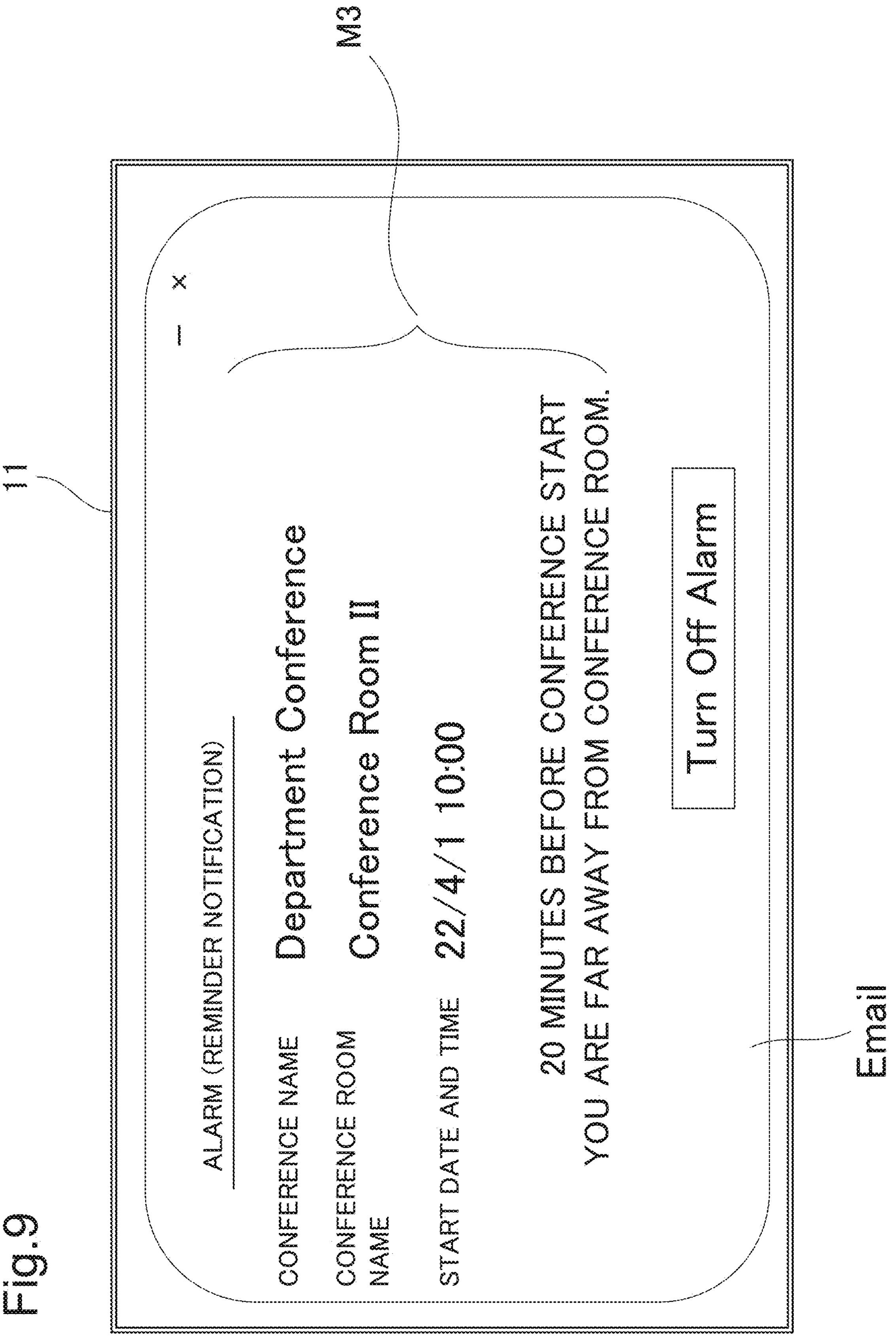
FIG. 9 is a view showing an e-mail as a reminder notification displayed on a display device of an information processing device of a participant.

In doing so, for example, the controller 19 of the conference room information processing device 10 describes as a text of the e-mail a message M3 indicating the conference name, the conference room name, the start date and time, and the reminder time T (for example, 20 minutes), for example, as shown as an example in FIG. 9.

Furthermore, it is possible that on the conference room information processing device 10 a company map showing where the network N (a corporate network) is deployed is previously stored in the storage device 17, and the controller 19 acquires the location of each of the participants' information processing devices 10 from the conference management data CD, compares the location with the company map to determine in which building or room of the company map the participant's information processing device 10 is present, and includes the building or room in the message M3.

This e-mail is received via the network N by the server 30 and sent from the server 30 to the participant's information processing device 10.

On the participant's information processing device 10, the communication device 14 receives the above e-mail and the controller 19 notifies of the receipt of the e-mail by an alert function and allows the display device 11 to display the e-mail on the screen. The participant can confirm, at the reminder sending date and time the reminder time T before the start date and time for the conference, the e-mail as a reminder notification received by its own information processing device 10 and thus promptly attend the conference.

The controller 19 of the conference room information processing device 10 determines whether or not sending of e-mails as reminder notifications to all the participants is completed (S125). When determining that the sending is not completed ("No" in S125), the controller 19 repeats the processing from S122 to S124. When the controller 19 determines that the sending is completed ("Yes" in S125), the control procedure shown in FIGS. 3A and 3B ends.

As described above, in this embodiment, when the level of importance of a conference is high, the reminder time T is set to "15 minutes", the reminder sending date and time is set to a date and time the reminder time T before the start date and time for the conference, and an e-mail as a reminder notification is sent from the conference room information processing device 10 through the server 30 to all the participants' information processing devices 10 at the reminder sending date and time. Thus, an e-mail as a reminder notification is sent earlier to each of the participants' information processing devices 10 and, thus, the participants can attend the conference in time.

Furthermore, for each of the participants, a travel time ta it takes for the participant to move to the conference room is calculated and a specific time tb is added to the travel time ta to calculate a preparation time tc (which may be the travel time ta itself). If the preparation time tc is longer than the reminder time T, the reminder time T is extended and, thus, the preparation time tc becomes equal to or shorter than the reminder time T. On the other hand, if the preparation time tc is not longer than the reminder time T, the reminder time T is kept as it is, a date and time the reminder time T before the start date and time for the conference is set to a reminder sending date and time, and an e-mail as a reminder notification is sent from the conference room information processing device 10 through the server 30 to the participant's information processing device 10 at the reminder sending date and time.

Thus, for the participant farther away from the conference room, an e-mail as a reminder notification is sent earlier to the participant's information processing device 10. For the participant not so far away from the conference room, an e-mail as a reminder notification is sent at a suitable time to the participant's information processing device 10. Therefore, each participant can attend the conference in time.

Moreover, when the reminder time T exceeds the allowable time Tx, the reminder time T is reduced to make it equal to the allowable time Tx. Therefore, it can be prevented that the reminder time T becomes excessively long to make the participants forget the conference.

<Modification 1>

The participants' information processing devices 10 include portable terminals or mobiles. When these portable terminals or mobiles move from their locations to other locations, the distance from the location of each portable terminal or mobile to the location of the conference room information processing device 10 (to the conference room) changes.

To cope with this, the controller 19 of each of the participants' information processing devices 10 continuously or periodically detects the location of its own information processing device 10 and allows the location to be saved through the network N and the server 30 into the data set CD1 of the conference management data CD to update the location of the participant's information processing device 10 in the conference management data CD.

On the day of the conference, the controller 19 of the conference room information processing device 10 executes the earlier described synchronization at regular time intervals to keep the contents of the conference management data CD up to date, calculates the respective distances from the locations of the participants' information processing devices 10 in the conference management data CD to the location of the conference room information processing device 10 (to the conference room), calculates the respective travel times ta of the participants based on the distances, thus calculates the respective preparation times tc for the participants' information processing devices 10, compares, for each of the preparation times tc for the participants' information processing devices 10, the preparation time tc with the reminder time T, extends the reminder time T when the preparation time tc is longer than the reminder time T, or keeps the reminder time T when the preparation time tc is not longer than the reminder time T, and restricts the reminder time T to the allowable time Tx or shorter. Thus, even when the location of each portable terminal or mobile changes, the reminder time T can be always appropriately set and, at an appropriate time, an e-mail as a reminder notification can be sent from the conference room information processing device 10 and received by the portable terminal or mobile.

<Modification 2>

In Modification 2, the reminder time T is extended according to the role of each of the participants in the conference.

For example, the manager operates the pointing device or the keyboard of the operation device 12 of the conference room information processing device 10 to enter the respective roles (a presenter, an observer or others) of the participants participant by participant. When the roles are accepted by the controller 19, the controller 19 allows the roles to be stored in the conference management data CD in the storage device 17 participant by participant. By reference to the role of each of the participants in the conference management data CD, the controller 19 of the conference room information processing device 10 extends the reminder time T by a predetermined specific time for the participant being a presenter or keeps the reminder time T as it is for the participant being an observer. Then, the controller 19 sets, for each participant, the reminder time T before the start date and time for the conference as a reminder sending date and time and allows an e-mail as a reminder notification to be sent through the server 30 to the participant's information processing device 10 at the reminder sending date and time.

Thus, the information processing device 10 of the presenter receives an e-mail as a reminder notification earlier than the other participants and, thus, the presenter can arrive in the conference room earlier than the other participants.

<Modification 3>

In Modification 3, the controller 19 of the conference room information processing device 10 starts to send an e-mail as a reminder notification at the reminder sending date and time and thereafter sends the same e-mail repeatedly at regular time intervals.

Then, the controller 19 counts the number of participants in the conference (participants whose names are displayed in the text box B26 in the setting window G1 for reminder notification shown in FIG. 5). When the number of participants in the conference (i.e., the number of information processing devices 10 on the receiving side) is less than a predetermined first threshold value (for example, ten), the controller 19 sets the frequency of periodically repetitive sending of the e-mail to a predetermined standard value (for example, every two minutes). On the other hand, when the number of participants in the conference is not less than the first threshold value, the controller 19 sets the frequency of periodically repetitive sending of the e-mail to a low level value (for example, every three minutes) a predetermined value (for example, one minute) lower in level than the standard value. The controller 19 executes sending of the e-mail repeatedly at the set frequency of sending from the reminder sending date and time.

When the number of participants in the conference is as many as not less than the first threshold value, calls for attention among the participants can prevent a prospective participant forgetting the conference from missing the conference and, therefore, the frequency of sending of an e-mail as a reminder notification is reduced. Conversely, when the number of participants in the conference is as small as less than the first threshold value, calls for attention among the participants are fewer and, therefore, the frequency of sending of an e-mail as a reminder notification is kept at the standard value.

Furthermore, when the number of participants in the conference is as small as less than the first threshold value and even not more than a second threshold value (for example, three) smaller than the first threshold value, the controller 19 may set the frequency of sending of the e-mail to a high level value (for example, every one minute) a predetermined value (for example, one minute) higher in level than the standard value and execute sending of the e-mail repeatedly at the frequency of sending consisting of the high level value from the reminder sending date and time.

Moreover, when the number of participants in the conference is less than the threshold value, the controller 19 may not only increase the frequency of repetitive sending but also change the reminder sending date and time to a date and time a predetermined time earlier (for example, three minutes earlier) than the current reminder sending date and time.

The present invention is not limited to the structure and configuration of the above embodiment and can be modified in various ways. Furthermore, the structures, configuration, and processing described in the above embodiment with reference to FIGS. 1 to 9 are merely illustrative of the present invention and are not intended to limit the present invention to the above structure, configuration, and processing.

The invention claimed is:

1. An information processing device on a sending side that sends notification information notifying of a start date and time for an event via a server on a network to another information processing device on a receiving side, the information processing device on the sending side comprising:

a communication device that communicates with the information processing device on the receiving side via the server;

an input device that accepts an input of a reminder sending date and time earlier than the start date and time for the event; and a controller includes a processor and, through the processor executing a control program, that, upon satisfaction of a predetermined condition, changes a first reminder sending date and time the input of which has been accepted by the input device to a second reminder sending date and time brought forward according to the condition and, at the second reminder sending date and time, executes sending of the notification information through the communication device to the information processing device on the receiving side where the notification information is to be received, wherein the condition is a condition that a number of information processing devices on the receiving side that receive the notification information is equal to or larger than a predetermined first threshold value, the controller counts the number of information processing devices on the receiving side that receive the notification information, when the condition is unsatisfied, the controller sets a frequency of sending of the notification information to a predetermined standard value, when the condition is satisfied, the controller sets the frequency of sending of the notification information to a low-level value a predetermined value lower in level than the standard value, and the controller repeatedly executes sending of the notification information at the set frequency of sending from the reminder sending date and time.

2. An information notification system comprising a plurality of information processing devices that send and receive, via a server on a network, notification information notifying of a start date and time for an event, the information notification system including, among the plurality of information processing devices, at least the information processing device according to claim 1 as an information processing device on a sending side that sends the notification information.

3. The information processing device according to claim 1, wherein when the condition is unsatisfied and the number of information processing devices on the receiving side is equal to or smaller than a second threshold value smaller than the first threshold value, the controller sets the frequency of sending of the notification information to a high level value a predetermined value higher in level than the standard value and repeatedly executes the sending of the notification information at the frequency of sending consisting of the high level value from the first reminder sending date and time or the second reminder sending date and time when the first reminder sending date and time is changed to the second reminder sending date and time.

4. The information processing device according to claim 3, wherein when the condition is unsatisfied and the number of information processing devices on the receiving side is equal to or smaller than the second threshold value smaller than the first threshold value, the controller changes the reminder sending date and time to a date and time a predetermined time earlier than the first reminder sending date and time or a date and time the predetermined time earlier than the second reminder sending date and time when the first reminder sending date and time is changed to the second reminder sending date and time, and repeatedly executes the sending of the notification information at the frequency of sending consisting of the high level value from the changed reminder sending date and time.

* * * * *